United States Patent
Dewitt et al.

(10) Patent No.: US 10,339,079 B2
(45) Date of Patent: Jul. 2, 2019

(54) SYSTEM AND METHOD OF INTERLEAVING DATA RETRIEVED FROM FIRST AND SECOND BUFFERS

(71) Applicant: Western Digital Technologies, Inc., Irvine, CA (US)

(72) Inventors: Dylan Mark Dewitt, Rochester, MN (US); Colin Christopher McCambridge, Rochester, MN (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 14/293,846

(22) Filed: Jun. 2, 2014

(65) Prior Publication Data

US 2015/0347012 A1 Dec. 3, 2015

(51) Int. Cl.
 *G06F 13/28* (2006.01)
 *G06F 3/06* (2006.01)

(52) U.S. Cl.
 CPC ...... *G06F 13/28* (2013.01); *G06F 2003/0691* (2013.01)

(58) Field of Classification Search
 None
 See application file for complete search history.

(56) References Cited

U.S. PATENT DOCUMENTS

| | | | |
|---|---|---|---|
| 6,678,754 B1 | 1/2004 | Soulier | |
| 7,287,101 B2 | 10/2007 | Futral et al. | |
| 7,328,304 B2 | 2/2008 | Royer, Jr. et al. | |
| 7,631,128 B1 * | 12/2009 | Sgrosso | G06F 3/06 709/203 |
| 7,668,524 B2 * | 2/2010 | Law | G11C 7/02 455/259 |
| 7,707,367 B1 * | 4/2010 | Tran | G06F 13/4054 709/230 |
| 8,176,252 B1 | 5/2012 | Alexander et al. | |

(Continued)

OTHER PUBLICATIONS

ORACLE® "Eliminating silent data corruption in oracle database," An Oracle an Emulex White Papers (Dec. 2008): 12 pgs.

(Continued)

*Primary Examiner* — Henry Tsai
*Assistant Examiner* — Christopher A Bartels
(74) *Attorney, Agent, or Firm* — Patterson & Sheridan, LLP; Steven Versteeg

(57) ABSTRACT

A host interface communicates with a non-volatile memory (NVM) device over a bus. The host interface includes a first buffer, a second buffer and a scatter/gather list (SGL). The first buffer stores blocks of application data to be communicated to the storage device. The second buffer stores blocks of protection data added by the host interface with respect to the blocks of application data stored in the first buffer. The SGL utilizes a first descriptor type that includes a first buffer address, a first buffer interleave burst length, and a burst count, and a second descriptor type that includes a second buffer address, and a second buffer interleave burst length, wherein only a first descriptor and a second descriptor is required to interleave application data from the first buffer with protection data from the second buffer.

17 Claims, 4 Drawing Sheets

(56) References Cited

U.S. PATENT DOCUMENTS

| | | | |
|---|---|---|---|
| 8,359,445 B2* | 1/2013 | Ware | G06F 13/1684 711/167 |
| 8,510,759 B1 | 8/2013 | McGowan | |
| 9,432,298 B1* | 8/2016 | Smith | H04L 49/9057 |
| 9,778,858 B1* | 10/2017 | Prasad | G06F 3/0613 |
| 2002/0144027 A1 | 10/2002 | Schmisseur | |
| 2004/0230797 A1* | 11/2004 | Ofek | G06F 21/14 713/168 |
| 2005/0262400 A1 | 11/2005 | Nadeau et al. | |
| 2005/0288960 A1 | 12/2005 | Sharp | |
| 2006/0250884 A1* | 11/2006 | Shimbayashi | G11C 7/1051 365/233.13 |
| 2007/0162643 A1 | 7/2007 | Tousek | |
| 2007/0239779 A1* | 10/2007 | Hugill | G06F 17/30038 |
| 2008/0077763 A1* | 3/2008 | Steinmetz | G06F 3/0613 711/170 |
| 2009/0292861 A1* | 11/2009 | Kanevsky | G06F 3/061 711/103 |
| 2011/0164460 A1* | 7/2011 | Kajigaya | G11C 5/02 365/189.05 |
| 2012/0069657 A1 | 3/2012 | Choi et al. | |
| 2012/0131253 A1* | 5/2012 | McKnight | G06F 1/30 710/308 |
| 2012/0210052 A1* | 8/2012 | Norman | G11C 5/02 711/103 |
| 2012/0233380 A1* | 9/2012 | Butterfield | G06F 13/16 711/103 |
| 2013/0042056 A1* | 2/2013 | Shats | G06F 12/0246 711/103 |
| 2013/0080689 A1* | 3/2013 | Jo et al. | 711/103 |
| 2013/0226887 A1 | 8/2013 | Braam et al. | |
| 2013/0275653 A1 | 10/2013 | Ranade et al. | |
| 2013/0275656 A1* | 10/2013 | Talagala | G06F 12/0246 711/103 |
| 2014/0208004 A1* | 7/2014 | Cohen et al. | 711/103 |
| 2014/0317362 A1* | 10/2014 | Tsurumi et al. | 711/154 |
| 2015/0006663 A1* | 1/2015 | Huang | G06F 13/4221 709/213 |
| 2015/0039948 A1* | 2/2015 | Um et al. | 714/710 |
| 2015/0095696 A1* | 4/2015 | Hess et al. | 714/6.24 |
| 2015/0113305 A1* | 4/2015 | Shin et al. | 713/322 |
| 2015/0142996 A1* | 5/2015 | Lu | 710/26 |
| 2015/0155044 A1* | 6/2015 | Yin | G06F 13/28 365/185.24 |
| 2015/0187043 A1* | 7/2015 | Shebanow | G06T 1/60 345/543 |
| 2015/0261434 A1* | 9/2015 | Kagan | G06F 13/28 711/103 |
| 2015/0278118 A1* | 10/2015 | Lee | G06F 12/145 711/102 |
| 2015/0377967 A1* | 12/2015 | Thiruvengadam | G01R 31/31715 714/731 |
| 2016/0011813 A1* | 1/2016 | Ellis | G06F 11/1048 714/763 |
| 2016/0085718 A1* | 3/2016 | Huang | H04L 29/08 709/213 |
| 2016/0291867 A1* | 10/2016 | Olcay | G06F 3/061 |
| 2017/0116117 A1* | 4/2017 | Rozen | G06F 12/0607 |
| 2017/0285940 A1* | 10/2017 | Benisty | G06F 3/061 |

OTHER PUBLICATIONS

Sapuntzakis et al., "The case for RDMA," (Dec. 2000): 13 pgs. http://www.cs.duke.edu/ari/publications/draft-csapuntz-caserdma-00.txt Accessed Oct. 9, 2013.

FreeBSD Architecture Handbook, "The FreeBSD Documentation Project," (2000): 216 pgs. http://docs.freebsd.org/doc/5.2-RELEASE/usr/share/doc/en/books/arch-handbook/book.html Accessed Oct. 9, 2013.

stackoverflow.com, "How to allocate DMA Buffer of 500 MB in Windows XP," (Jan. 2013): 2 pgs. http://stackoverflow.com/questions/14480251/how-to-allocate-dma-buffer-of-500-mb-in-windows-xp Accessed Oct. 8, 2013.

"Direct Memory Access (DMA)," (Oct. 19, 2013) :22 pgs. http://uw714doc.sco.com/en/UDI_spec/ad_dma.html Accessed on Oct. 9, 2013.

Petersen, M.K., "I/O controller data integrity extensions," (Jan. 12, 2007): 9 pgs. https://oss.oracle.com/~mkp/docs/dix.pdf.

Scobie, P., "Symbian OS internals/13. peripheral support," (Jul. 26, 2012): 38 pgs. http://developer.nokia.com/community/wiki/Symbian_OS_Internals/13._Peripheral_Support Accessed on Oct. 10, 2013.

Ultrastor®, "Tiered storage—Reduce storage costs—Migrate non-critical data to low-cost storage media," (2013): 2 pgs. http://www.ultrastor.com/index.php/solutions/by-application/tiered-storage Accessed on Nov. 8, 2013.

Intel®, "Cold storage in the cloud: trends, challenges, and solutions," White Paper (2013) http://www.intel.com/content/dam/www/public/us/en/documents/white-papers/cold-storage-atom-xeon-paper.pdf.

Rydning et al., "Technology assessment: cold storage is hot again—finding the frost point," IDC #241005 (May 2013) vol. 1: 15 pg. http://www.storiant.com/resources/Cold-Storage-Is-Hot-Again.pdf.

Moore et al., "Disk and tape storage cost models," (May 3, 2007) http://chronopolis.sdsc.edu/publications/assets/docs/dt_cost.pdf, pp. 4.

Yan, M., "Cold storage hardware v0.5 ST-draco-abraxas-0.5," Open Compute Project (Oct. 9, 2013): 1-13. http://www.opencompute.org/assets/download/Open-Compute-Project-Cold-Storage-Specification-v0.5.pdf.

Dell®, "Dell flash storage," (Nov. 7, 2013) http://www.dell.com/learn/us/en/04/campaigns/compellent-storage-center Accessed on Nov. 7, 2013. 3 pgs.

Krzyzanowski, P., "Building scalable and reliable systems," Distributed Systems—Clusters (Apr. 2007): pp. 1-11. http://www.cs.rutgers.edu/~pxk/rutgers/notes/content/clusters.html Accessed Nov. 7, 2013.

Zhu et al., "Reducing energy consumption of disk storage using power-aware cache management," Software—IEE Proceedings (Feb. 14-18, 2004): 12 pgs. http://citeseerx.ist.psu.edu/viewdoc/download?doi=10.1.1.93.9178&rep=rep1&type=pdf.

* cited by examiner

1st SGL Descriptor Type 200

| Byte/Bit | 7 | 6 | 5 | 4 | 3 | 2 | 1 | 0 | |
|---|---|---|---|---|---|---|---|---|---|
| 0 | | | | | | | | | |
| ... | | | | Buffer 1 Address | | | | | 202 |
| 7 | | | | | | | | | |
| 8 | | | | | | | | | |
| .. | | | | Buffer 1 Interleave Burst Length | | | | | 204 |
| 11 | | | | | | | | | |
| 12 | | | | Burst Count | | | | | 206 |
| 13 | | | | | | | | | |
| 14 | | | | Reserved | | | | | 208 |
| 15 | | | | Descriptor Type | | | | | 210 |

FIG. 2A

2nd SGL Descriptor Type 214

| Byte/Bit | 7 | 6 | 5 | 4 | 3 | 2 | 1 | 0 | |
|---|---|---|---|---|---|---|---|---|---|
| 0 | | | | | | | | | |
| ... | | | | Buffer 2 Address | | | | | 216 |
| 7 | | | | | | | | | |
| 8 | | | | | | | | | |
| .. | | | | Buffer 2 Interleave Burst Length | | | | | 218 |
| 11 | | | | | | | | | |
| 12 | | | | | | | | | |
| ... | | | | Reserved | | | | | 220 |
| 14 | | | | | | | | | |
| 15 | | | | Descriptor Type | | | | | 222 |

FIG. 2B

SYSTEM AND METHOD OF INTERLEAVING DATA RETRIEVED FROM FIRST AND SECOND BUFFERS

TECHNICAL FIELD

This disclosure relates generally to a communication bus and in particular to communication interfaces for the bus.

BACKGROUND

As central processing units (CPUs) continue to get faster, the memory units that supply the data to the CPUs must continually get faster as well. In a typical computer system, a variety of different memory devices are employed to meet the needs of a particular application, wherein each memory device provides a trade-off in storage capacity, cost and response time. System performance is maximized by utilizing the devices in a hierarchy arrangement, utilizing both extremely fast, but low-capacity memory devices in combination with slower, higher capacity memory devices. The memory hierarchy would include both on-chip memory devices (e.g., processor registers, caches, etc.) as well as off-chip memory devices (e.g., main memory devices and disk storage). For example, a computer system may employ a hard disk drive (HDD) as the disk storage device and a dynamic random access memory (DRAM) as the main memory. The hard disk drive provides cheaper storage (i.e., cost/GB), and higher capacity, but slower response time. In contrast, the DRAM device provides faster response time, but at higher cost and lower capacity.

In recent years, non-volatile memory (NVM) devices in the form of solid-state drives have been employed as a complementary type of disk storage, used either instead of or in conjunction with a HDD. The NVM devices provide faster response time than a typical HDD, but at a slightly higher cost per gigabyte (GB). Both are located "off-board", and therefore communicate with the CPU or host system via a data bus. As such, HDD and NVM devices are often referred to as an "Input/Output (I/O) Memory Tier", because they require input/output operations to communicate with the CPU (referred to herein as the host system).

The host system communicates with the NVM device via the data bus according to an interface protocol. For example, peripheral component interconnect express (PCIe) data buses have gained popularity in recent years. Interface protocols, such as non-volatile memory express (NVMe) and SCSI over PCIe (SOP) have been created to provide a common interface for these devices to use to enable communication.

The SOP interface standard being developed provides for the creation in the host system of an inbound command queue and an outbound command queue. For example, if the host system would like to write data to the NVM device, a write command is placed in the inbound command queue where it is retrieved by the NVM device. In addition, the host system creates a data buffer where application data to be written is stored as well as a protection or metadata buffer that stores information to be appended to the application data. For some NVM devices and/or modes, application data and protection data is interleaved when received by the device. For these devices, the host system may create a third buffer where data is interleaved before being retrieved by the NVM device in response to the write command. However, use of a third buffer to store data already stored to first and second buffers is duplicitous and therefore not cost effective.

In other embodiments, to avoid the cost associated with a third buffer, scatter/gather list (SGL) descriptors—created by the host system and utilized by the NVM device to determine the location of application data and protection data to be retrieved—are utilized to provide the desired interleaving of data from different buffers. This requires that for every block of application data and corresponding block of protection data, a separate pair of SGL descriptors must be created. For a message that includes a number of data blocks, the overhead to create and store the required SGL descriptors becomes prohibitive.

It would therefore be desirable to provide a more efficient manner of interleaving data within the framework of the communication interface standards developed.

SUMMARY

In general, this disclosure describes communication interfaces that allow a host system to communicate with a non-volatile memory (NVM) device, and in particular to techniques that allow data to be interleaved from first and second buffers within the framework of a communication standard.

According to one example of the disclosure, a host interface communicates with a non-volatile memory (NVM) device over a bus. The host interface includes a first buffer, a second buffer and a scatter/gather list (SGL). The first buffer stores blocks of application data to be communicated to the storage device. The second buffer stores blocks of protection data added by the host interface with respect to the blocks of application data stored in the first buffer. The SGL utilizes a first descriptor type that includes a first buffer address, a first buffer interleave burst length, and a burst count, and a second descriptor type that includes a second buffer address, and a second buffer interleave burst length, wherein only a first descriptor and a second descriptor is required to interleave application data from the first buffer with protection data from the second buffer.

According to another embodiment, a method of communicating data from a host system to a NVM device over a bus includes adding application data comprised of a plurality of blocks to a first buffer. Protection data comprised of a plurality of blocks is added to a second buffer, wherein each block of protection data is generated with respect to a block of application data. A first descriptor of a first descriptor type that includes an address identifying a start of application data in the first buffer, a burst length of the application data, and burst count is created. A second descriptor of a second descriptor type that includes an address identifying a start of protection data in the second buffer, and a burst length of the protection data is created and the first and second descriptors are stored to a scatter/gather list. The first descriptor and the second descriptor are retrieved from the scatter/gather list and using the descriptors to interleave data retrieved from the first buffer and the second buffer.

According to another embodiment, a system comprises a host system, a communication bus, and a non-volatile memory (NVM) device. The host system includes a processor and a memory. The memory is arranged to host a first buffer that stores application data, a second buffer that stores protection data, and a scatter/gather list that stores a first descriptor type that includes a first buffer address, a first buffer interleave burst length, and a burst count, and a second descriptor type that includes a second buffer address, and a second buffer interleave burst length. The processor executes a host driver that provides application data to the first buffer and generates the protection data provided to the second buffer and the first descriptor and the second descriptor provided to the scatter/gather list (SGL). The NVM device communicates with the host system via the communication bus, wherein the NVM device retrieves the first and second descriptor from the scatter/gather list and utilizes the first and second descriptors to interleave application data from the first buffer with protection data from the second buffer.

BRIEF DESCRIPTION OF THE DRAWINGS

FIGS. 2A-2B are block diagrams illustrating first and second scatter/gather list (SGL) descriptor types utilized according to an embodiment of the present invention.

DETAILED DESCRIPTION

The present disclosure describes a system and method of interleaving data from separate buffers for communication to a non-volatile memory (NVM) device via a bus. In particular, the disclosed system and method minimizes host system resources required to interleave data within the framework of the interface standards.

Figure 1:
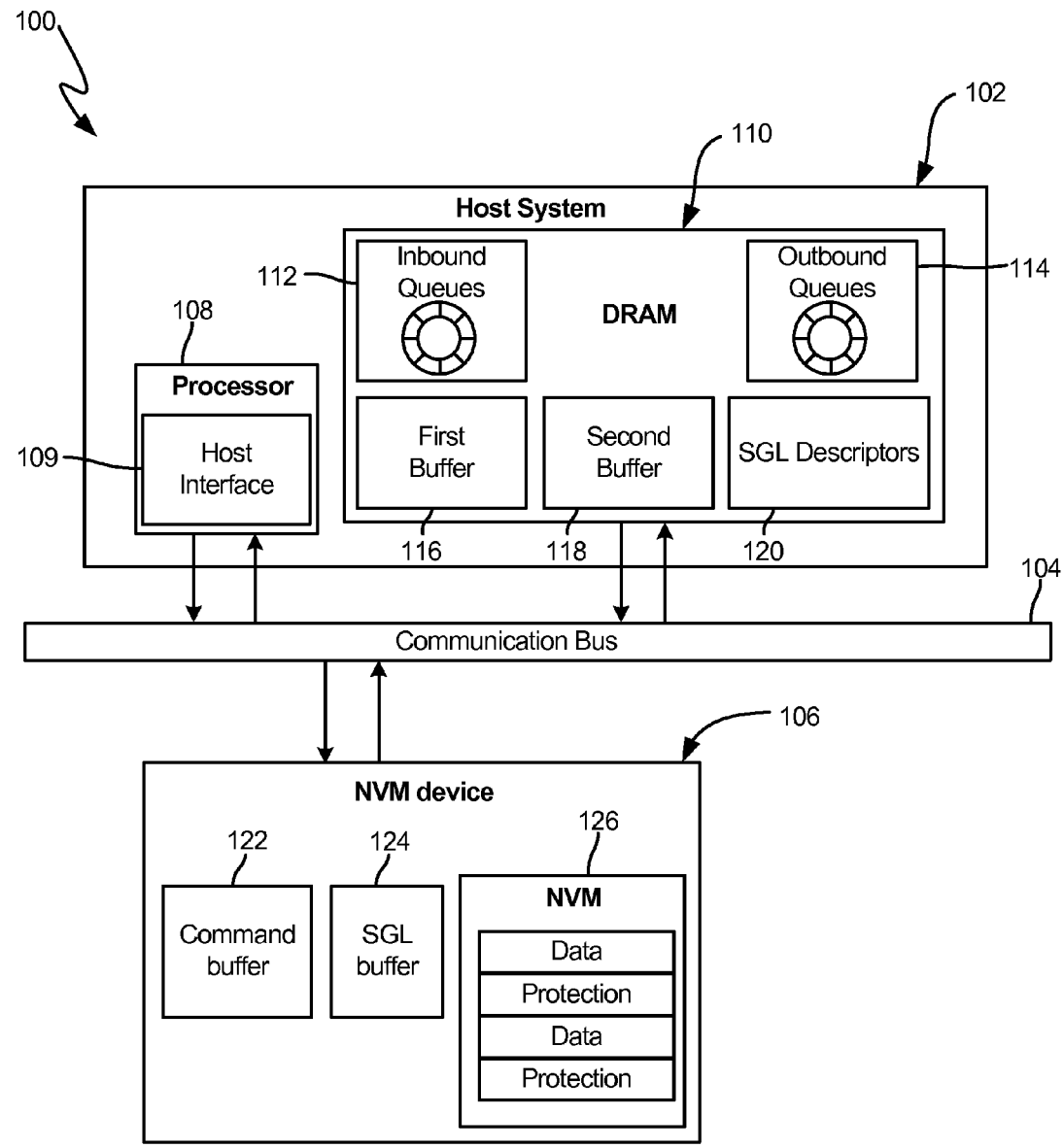
FIG. 1 is a block diagram of a system including a host system, a communication bus, and a non-volatile memory (NVM) device connected to store data communicated by the host system via the communication bus according to an embodiment of the present invention.

FIG. 1 is a block diagram of system 100 that includes a host system 102, communication bus 104, and NVM device 106. Host system 102 further includes processor 108—executing host interface 109—and memory 110, which in turn includes inbound queue 112, outbound queue 114, first buffer 116, second buffer 118, and scatter/gather list 120. NVM device 106 includes command buffer 122, SGL buffer 124 and NVM memory 126.

Communication between host system 102 and NVM device 106 is based on a selected standard that dictates how those communications will be handled, with both host system 102 and NVM device 106 including interfaces for facilitating communication according to the selected standard. For example, in an exemplary embodiment, communication bus 104 is a Peripheral Component Interface express (PCIe) bus that utilizes a communication standard such as Non-Volatile Memory express (NVMe) communication or the SCSI over PCIe (SOP) communication standard. The embodiment shown in FIG. 1 is described with respect to the SOP communication standard. Interfaces associated with host system 102 and NVM device 106 utilize the SGL format defined by the PCIe Queuing Interface (PQI).

The embodiment shown in FIG. 1 illustrates the host system interface and NVM device interface utilized to communicate according to the SOP communication standard. For example, processor 108 executes a host interface driver and memory 110 hosts the data structures utilized by the host interface driver to prepare data to be transferred via communication bus 104 to attached device 106. To write data to attached device 106, application data is provided to first buffer 116. Application data is comprised of a plurality of blocks of data, each equal in size, which are stored physically contiguously in the first buffer. Application data may be comprised of only a few blocks of data, or may be comprised of hundreds of blocks of data. In addition, host interface 109 creates with respect to each block of application data, a block of metadata or protection data that is placed in second buffer 118. Host interface 109 also creates scatter/gather list (SGL) descriptors that provide information that allows NVM device 106 to retrieve data from the first and second buffers 116, 118, respectively.

According to an embodiment of the present invention, unique SGL descriptor types are created that allow a single pair of SGL descriptors to provide sufficient information for NVM device 106 to retrieve each of the plurality of blocks of data from first buffer 116 and second buffer 118, while providing the desired interleaving of the data. This is in contrast with current SGL descriptors, which require a separate SGL descriptor for each block of data stored in first buffer 116 and second buffer 118, or requires a separate, third buffer for providing the desired interleaving of data from first buffer 116 and second buffer 118.

A first descriptor type provides fields describing where the application data can be found within first buffer 116, a length of each block of application data, and a total number of blocks included as part of the application data. A second SGL descriptor type is created by the host interface driver to access protection data and interleave it with the application data. The second type of SGL descriptor includes fields describing where the protection data can be found within second buffer 118 and a length of each block of protection data. Because there is a 1:1 correlation between application data blocks and protection data blocks, the second type of SGL descriptor does not further require a burst count field. FIGS. 2A-2B illustrate exemplary embodiments of first and second SGL descriptor types according to an embodiment of the present invention, discussed in more detail below.

Having created and placed protection data in second buffer 118, and created first and second SGL descriptors of the type described above in the SGL descriptors block 120, host interface 109 indicates that data is ready to be written to NVM device 106 by placing a write command in inbound queue 112.

NVM device 106 retrieves the write command from inbound queue 112 and stores the retrieved command in command buffer 122. Based on the retrieved write command, NVM device 106 accesses and retrieves first and second SGL descriptors from SGL descriptor block 120 and stores the retrieved SGL descriptors in SGL buffer 124. In one embodiment, first and second descriptors of the type described above are required to be provided as a pair. If only an SGL descriptor of the first type is retrieved, or only an SGL descriptor of the second type, then an error condition is generated. Assuming both first and second descriptor types are retrieved and stored to SGL buffer 124 then NVM device 106 starts the data retrieval process. Based on information provided by the first and second SGL descriptors, NVM device 106 retrieves blocks of application data from first buffer 116 and blocks of protection data from second buffer 118. In one embodiment, NVM device 106 retrieves all blocks of application data from first buffer 116 based on the first SGL descriptor, and then retrieves all blocks of protection data from second buffer 118 based on the first and second SGL descriptors. Once retrieved, NVM device 106 interleaves application data and protection data locally prior to storage within NVM 126. In another embodiment, NVM device 106 alternately retrieves blocks of application data from first buffer 116 and blocks of protection data from second buffer 118. In this way, although additional read operations are required, application data and protection data are interleaved as part of the retrieval process before being stored in data/protection buffer 126. Upon retrieving blocks of data from both first buffer 116 and second buffer 118, NVM device 106 places a message in outbound queue 114 indicating that the task is complete.

For the sake of simplicity, the present disclosure describes the use of specialized SGL descriptors to write interleaved data to an attached NVM device. However, these specialized SGL descriptors may similarly utilized during read operations from NVM device 106. The process is approximately the same, except that a read command replaces the write command placed in inbound queue 112, and NVM device 106 places application data and protection data into first buffer 116 and second buffer 118, respectively, rather than retrieving data from these buffers. The read operation is initiated by host interface 109 creating first and second descriptors and placing them in SGL descriptors 120. In addition, a read command is placed in inbound queue 112. NVM device 106 retrieves the read command from inbound queue 112, and retrieves the stored SGL descriptors. In response, NVM device 106 retrieves the requested data, which includes application data and protection data interleaved together. Based on the retrieved SGL descriptors, NVM device 106 un-interleaves the application data and the protection data, placing the application data into first buffer 116 and the protection data into second buffer 118. Once finished, NVM device 106 places a read complete message into outbound queue 114.

As discussed above, the process requires that SGL descriptors of the first and second type be utilized in conjunction with one another. If only one of the SGL descriptor types is received, the process returns an error message. In addition, in one embodiment the SGL descriptor of the first type must be followed by the SGL descriptor of the second type.

FIGS. 2A-2B are block diagrams illustrating first and second scatter/gather list (SGL) descriptor types utilized according to an embodiment of the present invention. In particular, FIG. 2A illustrates a first type of SGL descriptor 200 that describes the application data located in the first buffer. First SGL descriptor type 200 includes a plurality of fields, including first buffer address 202, first buffer interleave burst length 204, burst count 206, a plurality of reserved fields 208, and descriptor type field 210. FIG. 2B illustrates a second type of SGL descriptor—utilized only in combination with the first type of SGL descriptor—that describes the protection data located in the second buffer. Second SGL descriptor type 214 includes a plurality of fields including second buffer address 216, second buffer interleave burst length 218, a plurality of reserved fields 220, and descriptor type field 222.

With respect to first SGL descriptor type 200, first buffer address field 202 identifies the location within the first buffer where the application data to be retrieved begins. First buffer interleave burst length field 204 identifies the size of each block of application data. For example, in one embodiment first buffer interleave burst length field 204 provides a value of 512 bytes, indicating that each block or burst of application data is comprised of 512 bytes. Burst count field 206 identifies the total number of blocks or bursts associated with the application data to be retrieved. For example, burst count field may store a value of three, indicating that as part of the retrieval process, three blocks of application data should be retrieved before the process ends.

With respect to second SGL descriptor type 214, second buffer address 216 identifies the location within the second buffer where the protection data to be retrieved begins. Second buffer interleave burst length field 218 identifies the size of each block of protection data, which may and typically is different that the size of each application data block. For example, in one embodiment second buffer interleave burst length field 218 provides a value of eight bytes, indicating that each block or burst of protection data is comprised of eight bytes.

A plurality of SGL descriptors may be utilized by the NVM device in conjunction with a PCIe Queuing Interface (PQI). As discussed above, SGL descriptors of the first and second type (shown in FIGS. 2A and 2B) must be used in conjunction with one another. Thus, if a first SGL descriptor is retrieved identified by descriptor type field 210 as being of the first type of SGL descriptor 200, it is expected that the next SGL descriptor retrieved will be identified by descriptor type field 222 as being of the second type of SGL descriptor 214. If the next SGL descriptor is identified by its descriptor type field as being another type of SGL descriptor, then an error message is generated.

Figure 3:
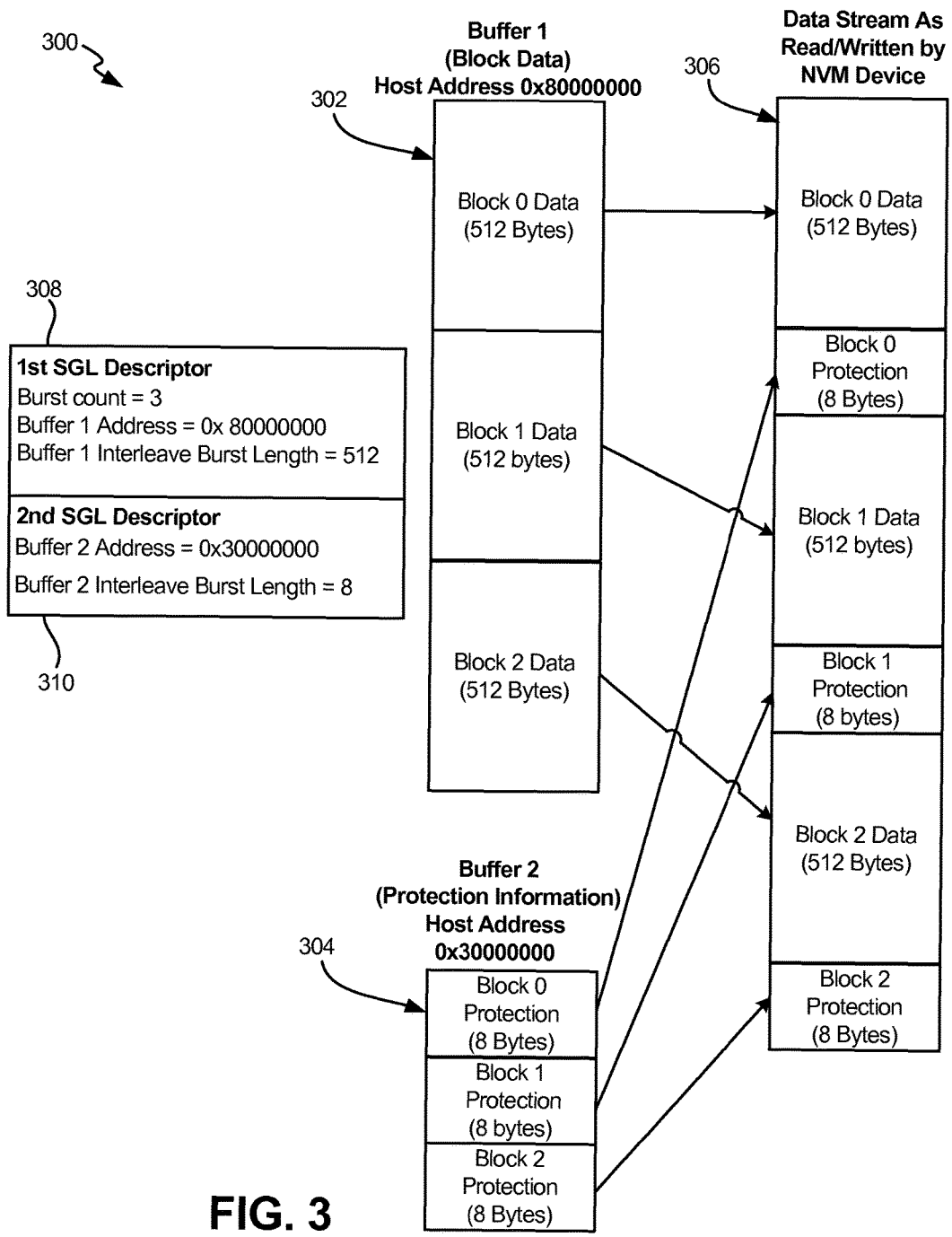
FIG. 3 is a block diagram illustrating use of the first and second descriptors to interleave data from a first buffer with data from a second buffer according to an embodiment of the present invention.

FIG. 3 is a block diagram illustrating use of first and second descriptor types to interleave application data from first buffer 302 with protection data from second buffer 304 according to an embodiment of the present invention. The interleaved stream is stored to interleaved data/protection buffer 306 associated with an attached NVM device. First descriptor 308 is a first descriptor type that includes fields described with respect to FIG. 2A, including first buffer address field, first buffer interleave burst length field, and burst count field. Second descriptor 310 of a second descriptor type includes fields described with respect to FIG. 2B, including second buffer address field, and second buffer interleave burst length field.

Based on the first descriptor 308 and second descriptor 310, the attached device alternately retrieves application data from first buffer 302 and protection data from second buffer 304. In this particular example, the first buffer address field identifies the location of 'Block 0 Data' as the first block of application data to be retrieved from first buffer 302. In addition, the first buffer interleave burst length identifies that the blocks of application data to be retrieved are each 512 bytes in length. With this information, the attached NVM device retrieves the first block of application data—'Block 0 Data'—from first buffer 302 and places it in interleaved data/protection buffer 306.

Next, protection data is retrieved from second buffer 304 based on information provided in second descriptor 310. In particular, the second buffer address field identifies the location of 'Block 0 Protection' as the first block of protection data to be retrieved from second buffer 304. In addition, the second buffer interleave burst length identifies that the blocks of protection data to be retrieved are eight bytes in length. With this information, the attached NVM device retrieves the first block of protection data—'Block-Protection'—from second buffer 304 and places it in interleaved data/protection buffer 306 contiguous with the first block of application data previously placed in the buffer.

Subsequently, blocks of application data and protection data are alternately retrieved from first buffer 302 and second buffer 304 until the number of blocks or bursts of data indicated by the burst count field in first descriptor 308 have been retrieved. In the example shown in FIG. 3, the burst count is three, so the process continues until three blocks of application data and three blocks of protection data have been retrieved from the first and second buffers, respectively. As a result of the alternate retrieval of data from first buffer 302 and second buffer 304, data provided to data/protection buffer 306 is interleaved as desired and illustrated in FIG. 3.

In the embodiment shown in FIG. 3, the attached NVM device alternately retrieves data from first buffer 302 and second buffer 304. Alternatively, the NVM device may—based on first descriptor 308—retrieve all application data from first buffer 302. The NVM device may then—based on second descriptor 310—retrieve all protection data from second buffer 304. Having retrieved application data from first buffer 302 and protection data from second buffer 304, the attached NVM device internally interleaves the received data prior to storage to data/protection buffer 306 (i.e. to the NVM). A benefit of this approach is that rather than alternatively retrieving data from first buffer 302 and second buffer 304, all application data is retrieved from first buffer 302 in one read operation, and then all protection data is retrieved from second buffer 304 in another read operation. Whether data is retrieved first from first buffer 302 or second buffer 304 is arbitrary, so long as data from both buffers is retrieved.

Figure 4:
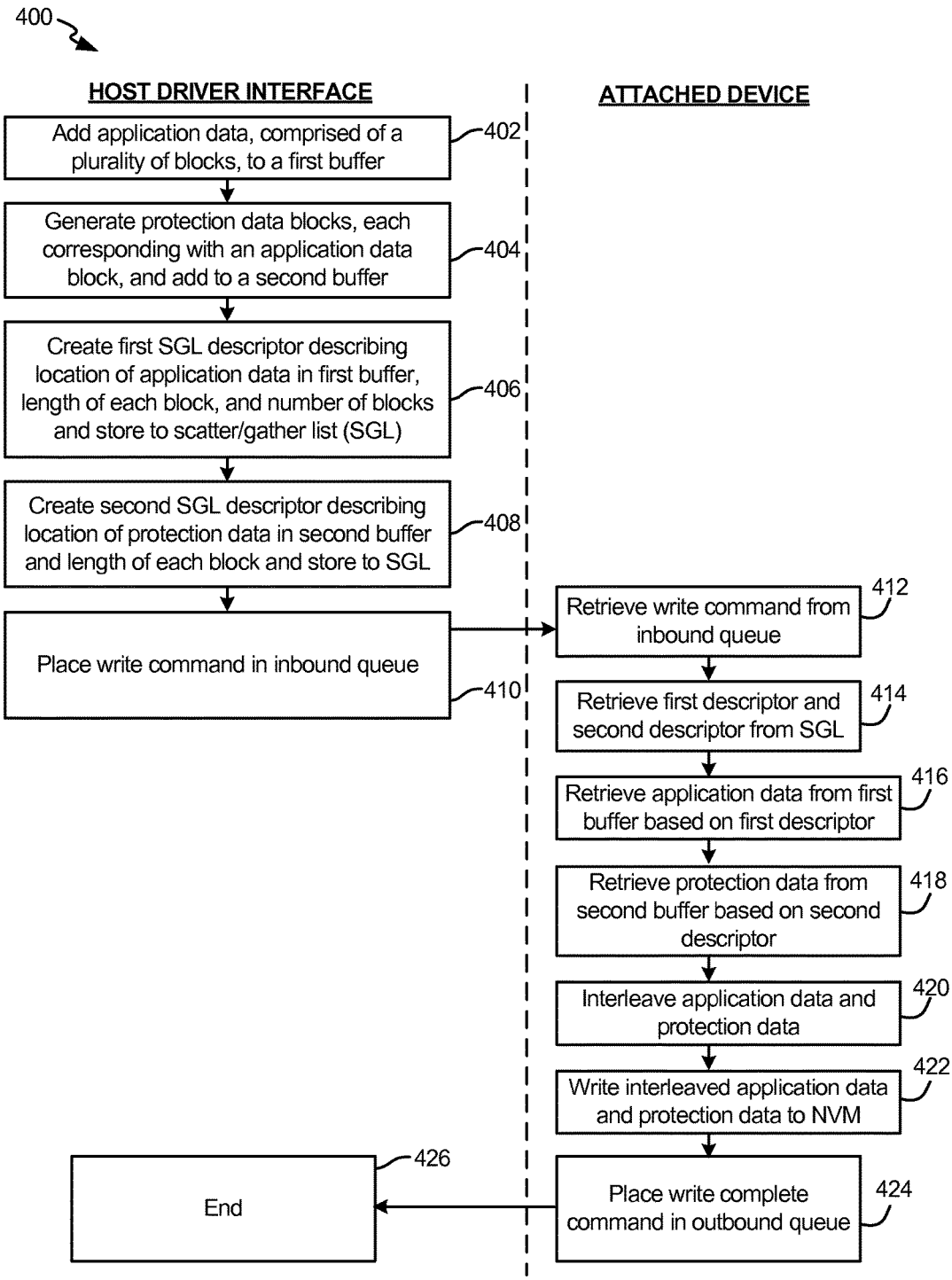
FIG. 4 is a swim-lane diagram illustrating a method of interleaving data communicated to a storage device according to an embodiment of the present invention.

FIG. 4 is a swim-lane diagram illustrating method 400 of interleaving data communicated to a non-volatile memory (NVM) device according to an embodiment of the present invention. The left side of the swim-lane diagram illustrates those actions performed by the host system, while the right-side of the swim-lane diagram illustrates those actions performed by the attached NVM device. At step 402, the host system begins a write command by adding application data, comprised of a plurality of blocks, to a first buffer.

At step 404, the host system generates with respect to each block of application data a block of protection data. As described above, the size of the application data blocks and protection data blocks are typically different. Protection data is stored to a second buffer separate from the first buffer.

At step 406, the host system creates a first descriptor of a first descriptor type. The first descriptor describes the location of application data stored in the first buffer, the length of each block of application data, and the number of blocks of application data stored. At step 408, the host system creates a second descriptor of a second descriptor type. The second descriptor describes the location of protection data stored in the second buffer and the length of each block of protection data. Both the first and second descriptors are stored in the scatter/gather list (SGL) buffer for subsequent retrieval by the attached device. In one embodiment, an application running on the host system is responsible for placing data into the first buffer, while the host interface creates protection data and SGL descriptors.

At step 410, having populated the first buffer with application data, created and populated the second buffer with protection data, and created first and second descriptors describing each buffer, the host system places a write command on the inbound queue for retrieval by the attached NVM device.

At step 412, the attached NVM device retrieves the write command from the inbound queue. At step 414, based on identification of the retrieved command as a write command, the attached device retrieves first and second descriptors from the SGL to begin the writing process. At step 416, the attached NVM device retrieves application data from the first buffer based on information provided in the first SGL descriptor. In this embodiment, the attached NVM device retrieves all application data indicated by the first SGL descriptor in a single read operation. At step 418, the attached NVM device retrieves protection data from the second buffer based on information provided in the second SGL descriptor. Once again, in this embodiment the attached NVM device retrieves all protection data indicated by the second SGL descriptor in a single read operation. As discussed with respect to FIG. 3, in other embodiments the attached NVM device alternatively retrieves application data from the first buffer and protection data from the second buffer so that data is retrieved in an interleaved fashion.

In the embodiment shown in FIG. 4, at step 420 the attached NVM device interleaves in an internal operation the retrieved application data and protection data, and then at step 422 writes the interleaved data to non-volatile memory for storage.

At step 424, having retrieved all application data and protection data, the attached device places a write complete message in the outbound queue of the host driver interface. At step 426, the host driver interface retrieves the write complete message from the outbound queue and the process ends.

The present invention addresses a method of efficiently interleaving data retrieved from at least first and second buffers by extending the capabilities of scatter/gather list descriptors. In particular, a first type of SGL descriptor is defined to include a 'first buffer address', a 'first buffer interleave burst length', and a 'burst count'. The 'first buffer address' identifies the start of the application data within the first buffer. The 'first buffer interleave burst length' identifies the length of each burst, and the 'burst count' identifies the number of bursts to be included in the interleaved data stream. Similarly, a second type of SGL descriptor is defined to include a 'second buffer address' and a 'second buffer interleave burst length'. The 'second buffer address' identifies where the start of the protection data stored within the second buffer. The 'second buffer interleave burst length' identifies the length of bursts stored to the second buffer. The first and second SGL descriptors are utilized by the storage device to retrieve data in an interleaved stream from the first buffer and the second buffer.

In this way, the present invention provides a system and method of interleaving data from separate buffers for communication to a non-volatile memory (NVM) device via a bus. The solution makes use of current standards such as SOP over PQI, but provides a solution that minimizes system resources required to communicate data over the data bus. For the sake of simplicity, embodiments have been described using two buffers, but could be extended to interleaving data from three or more separate buffers. Embodiments utilizing additional buffers may require additional SGL descriptors. For example, an embodiment requiring interleaving of a third buffer may utilize a third SGL descriptor type that is similar in format to the second SGL descriptor type, except that it would indicate the address of the third buffer, and the burst length associated with data in the third buffer.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A host system that communicates with a non-volatile memory (NVM) device over a network, the host system comprising:
   a memory including a first buffer and a second buffer; and
   a processor configured to execute a host interface configured to:
      store blocks of application data to be communicated to the NVM device in the first buffer;
      generate a respective block of metadata for each respective block of application data metadata;
      store the respective blocks of metadata in the second buffer;
      store a first descriptor type that includes a first buffer address, a first buffer interleave burst length, and a burst count indicating a total number of blocks contained in the first buffer, wherein there is a one-to-one correlation between blocks of application data and blocks of metadata; and a second descriptor type that includes a second buffer address and a second buffer interleave burst length but no burst count in a scatter/gather list (SGL) stored in the memory, the second descriptor created by a host interface driver, wherein only a first descriptor of the first descriptor type and a second descriptor of the second descriptor type is required to interleave blocks of application data retrieved from the first buffer with associated blocks of protection data retrieved from the second buffer using, wherein the second descriptor employs the burst count of the first descriptor for said interleaving;
      generate the scatter/gather list having pairs of descriptors wherein each pair is made from the first descriptor type and the second descriptor type, wherein a single pair of descriptors is configured to provide sufficient information for the NVM device to retrieve each of a plurality of blocks of data from the first buffer and the second buffer and to provide an interleaving of the data.

2. The host system of claim 1, wherein the memory comprises dynamic random access memory (DRAM).

3. The host system of claim 1, wherein the network is a peripheral component interface express (PCIe) bus.

4. The host system of claim 1, wherein the first buffer also stores blocks of application data read from the NVM device, and the second buffer also stores blocks of metadata read from the NVM device, wherein the first descriptor type and the second descriptor type are utilized to un-interleave data retrieved from the NVM device.

5. A system comprising:
   a host system comprising:
   a processor;
   a memory that hosts a first buffer that stores blocks of application data, a second buffer that stores blocks of metadata, and a scatter/gather list that stores a first descriptor type that includes a first buffer address, a first buffer interleave burst length, and a burst count indicating a total number of blocks contained in the first buffer, wherein there is a one-to-one correlation between blocks of application data and blocks of metadata, and a second descriptor type that includes a second buffer address, and a second buffer interleave burst length but no burst count; wherein the processor executes a host interface that:
      generates the a respective block of metadata for each respective block of application data;
      provides the respective blocks of metadata to the second buffer;
      generates a first descriptor of the first descriptor type;
      provides the first descriptor to the scatter/gather list;
      generates a second descriptor of the second descriptor type, the second descriptor created by a host interface driver; and provides the second descriptor to the scatter/gather list;
   a communication bus;
      generate the scatter/gather list having the descriptors, wherein a single pair of descriptors is configured to provide sufficient information for the NVM device to retrieve each of a plurality of blocks of data from the first buffer and the second buffer and to provide an interleaving of the data; and
   a non-volatile memory (NVM) device that communicates with the host system via the communication bus, wherein the NVM device retrieves the first and second descriptors from the scatter/gather list and utilizes the first and second descriptors to interleave blocks of application data from the first buffer with blocks of metadata from the second buffer, wherein the second descriptor employs the burst count of the first descriptor for said interleaving.

6. The system of claim 5, wherein the communication bus is a peripheral component interface express (PCIe) bus.

7. The system of claim 5, wherein the storage device is a SCSI over PCIe (SOP) device.

8. The system of claim 5, wherein the non-volatile memory device retrieves all blocks of application data identified by the first descriptor from the first buffer, and then retrieves all blocks of metadata identified by the first and second descriptor from the second buffer.

9. The system of claim 8, wherein the non-volatile memory device interleaves the retrieved blocks of application data and retrieved blocks of metadata prior to saving interleaved data to non-volatile memory.

10. The system of claim 5, wherein the non-volatile memory device alternatively retrieves blocks of application data from the first buffer and blocks of metadata from the second buffer until all data indicated by the first and second descriptors has been retrieved.

11. A method of communicating data from a host system to a non-volatile memory (NVM) device over a bus, the method comprising:
   adding, by a host interface executed by a processor, blocks of application data to a first buffer;
   generating, by the host interface, a respective block of metadata for each respective block of application data;
   adding, by the host interface, the respective blocks of metadata to a second buffer;
   creating, by the host interface, a first descriptor of a first descriptor type that includes an address identifying a start of blocks application data in the first buffer, a burst length of the blocks of application data, and burst count indicating a total number of blocks contained in the first buffer, wherein there is a one-to-one correlation between blocks of application data and blocks of metadata;
   creating, by the host interface, a second descriptor of a second descriptor type that includes an address identifying a start of the blocks of metadata in the second buffer, and a burst length of the blocks of metadata, but no burst count, wherein the first and second descriptor are stored to a scatter/gather list, the second descriptor created by a host interface driver;

generate the scatter/gather list having pairs of descriptors made from the first descriptor type and the second descriptor type, wherein a single pair of descriptors is configured to provide sufficient information for the NVM device to retrieve each of a plurality of blocks of data from the first buffer and the second buffer and to provide an interleaving of the data; and retrieving the first descriptor and the second descriptor from the scatter/gather list and using the descriptors to interleave data retrieved from the first buffer and the second buffer, wherein the second descriptor employs the burst count of the first descriptor for said interleaving.

12. The method of claim 11, wherein the first buffer, the second buffer, and the scatter/gather list are stored in dynamic random access memory (DRAM).

13. The method of claim 11, further including:
retrieving, by the NVM device, all application data from the first buffer based on the first descriptor;
retrieving, by the NVM device, all metadata from the second buffer based on the second descriptor; and
interleaving, by the NVM device, the application data and the protest-ion-data metadata locally at the NVM device before storing to non-volatile memory.

14. The method of claim 11, further including:
a. retrieving, by the NVM device, a block of application data from the first buffer based on the first descriptor;
b. retrieving, by the NVM device, a block of metadata from the second buffer based on the second descriptor; and
c. repeating, by the NVM device, steps a. and b. until all application data and metadata identified in the first descriptor have been retrieved.

15. The method of claim 11, further comprising, creating, by the host interface, the metadata based on the corresponding blocks of application data.

16. The method of claim 11, wherein the bus is a peripheral component interface express (PCIe) bus.

17. The method of claim 11, wherein the NVM device is a SCSI over PCIe (SOP) device.

* * * * *